Aug. 14, 1928.

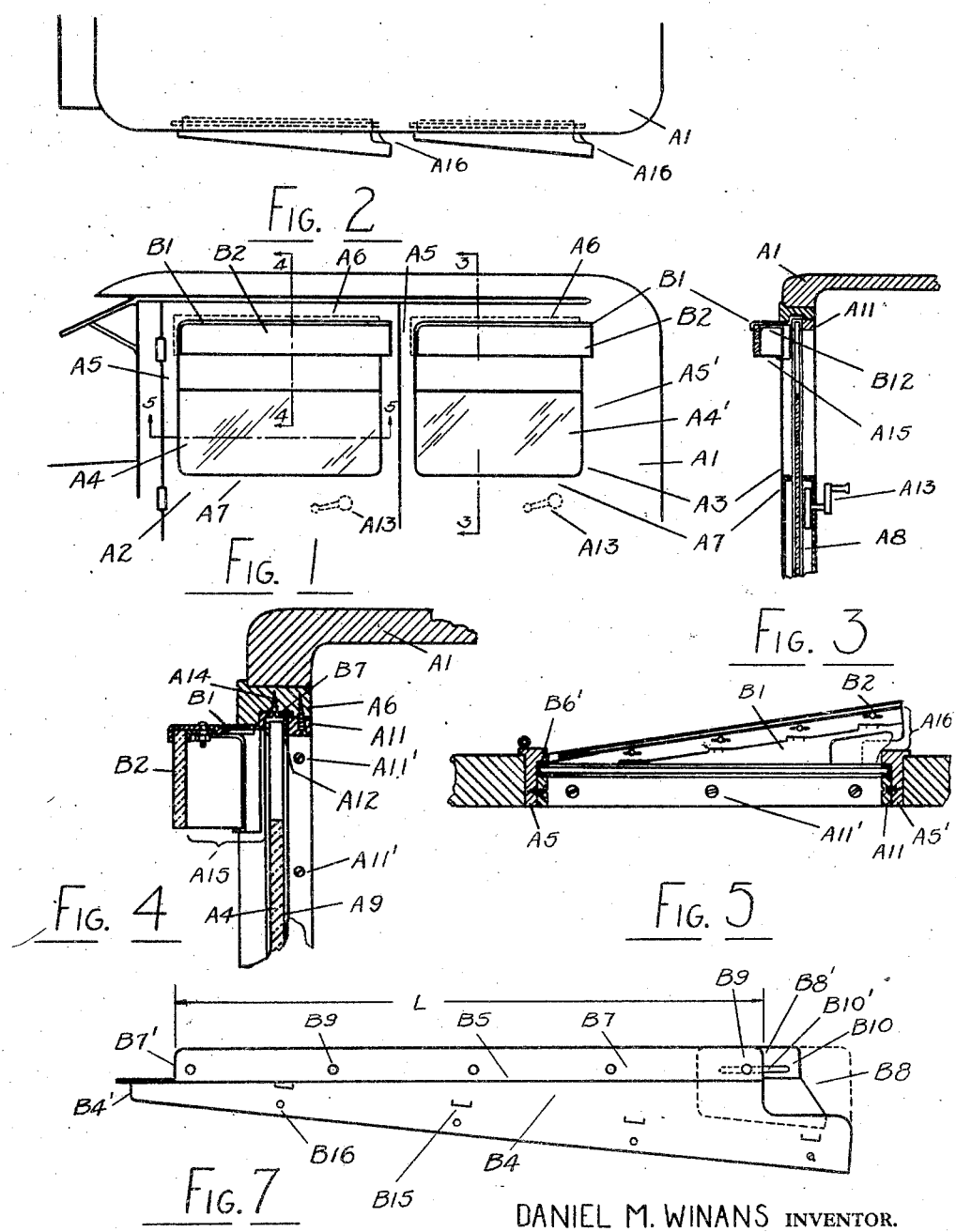

D. M. WINANS 1,680,966

VENTILATOR FOR CLOSED VEHICLES

Filed Oct. 3, 1927    2 Sheets-Sheet 2

DANIEL M. WINANS INVENTOR.

BY Louis Illmer.

ATTORNEY.

Patented Aug. 14, 1928.

1,680,966

UNITED STATES PATENT OFFICE.

DANIEL M. WINANS, OF BINGHAMTON, NEW YORK, ASSIGNOR TO THE BREWER-TITCHENER CORPORATION, OF CORTLAND, NEW YORK, A CORPORATION OF NEW YORK.

VENTILATOR FOR CLOSED VEHICLES.

Application filed October 3, 1927. Serial No. 223,557.

This invention relates to the art of ventilators and more particularly to ventilators of the canopy type applicable to a closed vehicle such as an automobile or other motor driven passenger car, the ventilator being so constructed that it prevents the entrance of rain, snow or dust, and creates an induced suction effect when the car is put in motion for the purpose of withdrawing fumes, smoke or foul air out of the car body compartment.

An object is to provide for a device of this character that may readily be fitted to any door panel or body side window, and more especially to doors or windows having slidable panels therein of the usual closed car type that may be regulatively raised or lowered with respect to the top sash rail in the conventional fashion, such adjustable pane then being utilized to control the egress of air from the interior of the vehicle without however impairing the driver's line of vision through such side window or the door panel or otherwise interfering with normal window manipulation.

The proper ventilation of closed vehicles does not depend so much upon providing openings for the admission of fresh air into the passenger compartment as to suitably arrange and locate openings for the removal of vitiated air from within the closed body. Ample air is usually admitted by leakage through adjustable cowl ventilators, crevices around the windshield, cracks in the floor boards and other loosely fitted members of the car compartment walls. It is customary to partially open one or more of the door or window panels in order to afford the desired circulation of air through the car compartment, but such direct forced ventilation is likely to set up an offensive draft in clear weather and has generally proven impracticable in the case of stormy or other inclement weather.

My method is therefore to cover the partially opened window with a canopy-like protective guard means preferably in the shape of a transparent pane mounted in a suitable frame adapted to longitudinally dispose one end of said pane in an overlapping canting relation to its adjacent body side in such fashion that the travel of the car is made to set up intense eddy air currents along the open plate edges and particularly at the rear gap end thereof. The air gliding along the outside face of said plate in turn creates a partial vacuum adjacent to the bottom and rear pane edges which sucks air out of the vehicle compartment, while at the same time preventing rain or snow from entering through these indirect ventilator openings. The present device proper is devoid of movable parts and the control of the air passage therethrough is accomplished by reducing or enlarging the top opening of the door or window panel, this being preferably adjusted by a crank or lever type of regulator such as now quite generally forms a part of modern closed car equipment.

Other features of my invention have to do with an improved canted mounting of the ventilator pane in its supporting frame and in adjusting means serving to fit my window ventilator frame to different sash widths commonly found in current used car models. Embodied herein are further details of structure and organization to accomplish the foregoing and related purposes, all of which will be more explicity set forth hereinafter.

Reference is had to the annexed two sheets of drawings which are illustrative of a specific embodiment of my invention, like characters of reference indicate like parts throughout the several views; and in which drawings:

Fig. 1 is a fragmental side view showing an upper forward portion of a closed vehicle body provided with a single side door and an adjacent side window, each carrying a slidable panel and exteriorly equipt with my canopy type of ventilator; while Fig. 2, represents a partial top view thereof.

Fig. 3 shows a sectional view of my installed ventilator applied to said window as taken along line 3—3 of Fig. 1, while Fig. 4 is an enlarged detail of an upper portion of said door as taken along line 4—4 of Fig. 1, and is substantially identical with the showing made in Fig. 3.

Fig. 5 represents a sectional view looking upwardly into the installed door ventilator as seen from the line 5—5 of Fig. 1.

Figure 6:
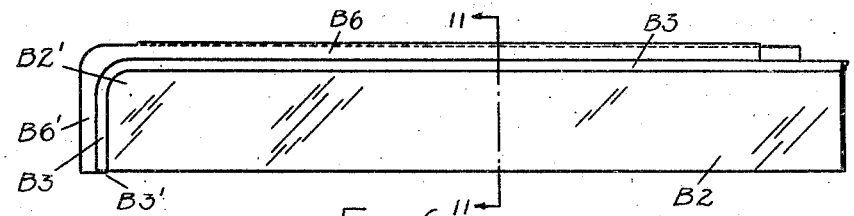
Fig. 6 is an elevational view of my assembled ventilator frame and transparent pane as it appears prior to installation, and Figs. 7 and 8, respectively show top and bottom views thereof.
Figure 8:
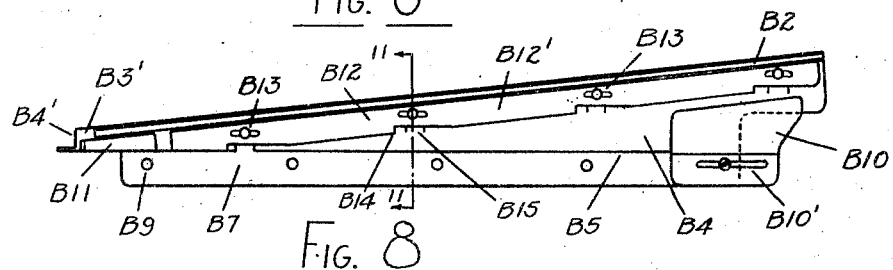
Figure 9:
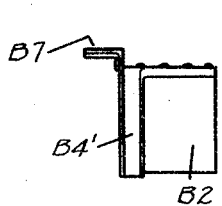
Figure 11:
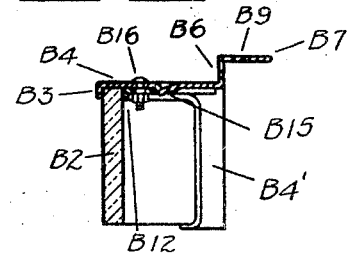
Figure 10:
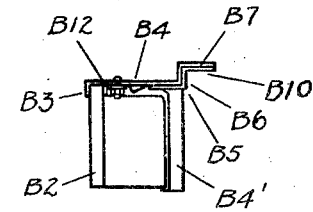

Figs. 9 and 10 respectively show opposite end views of Fig. 6, while Fig. 11, is an enlarged sectional view taken along line 11—11 of Fig. 6 or Fig. 8.

Figure 12:
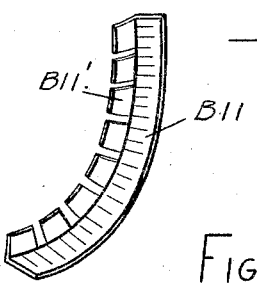

Fig. 12 shows in perspective, a trough-like elbow frame piece adapted to resiliently hold the forward end of my ventilator pane in place.

Figure 13:
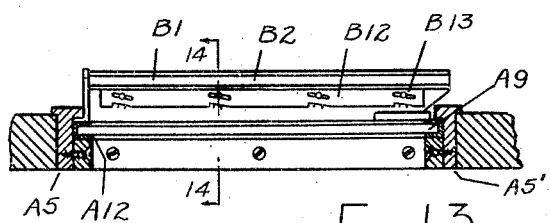
Figure 14:
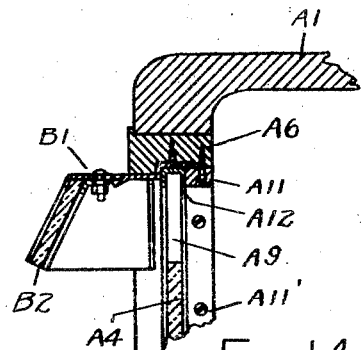

Fig. 13 shows bottom view of a modern style of ventilator bracket or frame which is similar to that embodied in the Fig. 5 assembly except that my ventilator pane is now disposed in a different canted or slanting relation to the sash engaging flange of my holding frame; Fig. 14 is an enlarged sectional view of said frame taken along line 14—14 of Fig. 13 and which view has been amplified to correspond with Fig. 3 for the purpose of better indicating the modified installation thereof.

Referring in detail to said drawings, the numeral A1 refers to a conventional vehicle body preferably of the closed type having a forward side door A2 and an adjacent side window A3, respectively provided with a plate glass pane or transparent panel A4 and A4'. The upper portion of said door frame comprises a pair of spaced side or upright sash posts A5 and A5' which are bridged by the top rail A6 and this superstructure is carried by the hollow bottom rail A7 that is usually slotted to provide for a panel receiving well A8 similar to that indicated in Fig. 3. The innermost faces of said complementary sash posts and also its top bridging member are preferably channeled to permit of the panel A4 to slide vertically and seat therein. As detailed in Fig. 4, such guide channel A9 may be formed between the conventional exteriorly offset sash rabbet and the detachable panel stop bead A11 which usually comprises separate mitered strips that are adjoined to the respective interior sash faces by screws A11' or the like. Retained within said panel encircling groove is a heavy U shaped felt lining A12 adapted to straddle and silence the marginal edge of the panel in the conventional manner. The lower edge of the panel may be operatively connected in any suitable manner to a lifting device such as the usual window regulator A13 adapted to adjustably raise or lower the upper edge of said panel with respect to its cooperating top rail. All of the aforesaid door panel features conform to present day common car practice; it will be further understood that the corresponding sash posts generally appear in the side window A3 as similarly identified in Fig. 1.

Referring now to the structural features embodied in my ventilator assembly, this comprises a unitary bracket or frame designated in its entirety as B1, preferably made of sheet steel and adapted to mount in cant-like fashion the rectangular pane B2 having a corner B2' and which pane may be fabricated from plate glass strip or any other clear, frosted or colored transparent medium. Cross-sectionally said pane holding frame may be given a zig-zag or stepwise profile shape, such for instance as is indicated in Fig 11; this shape is preferably disposed in angular relation and adapted to embrace the marginal contour of both adjacent pane edges that converge toward said ventilator pane corner B2'. (See Fig. 6.) One such stepped flange portion of my unitary frame identified as B3, is a stop flange and this is arranged to overlap the outer upright face of the aforesaid pane margin. Adjoined to said flange and extending laterally therefrom, is a horizontally disposed ledge portion B4 that is also angularly shaped by virtue of the depending portion B4' to make it conform with said converging edges of the pane contour. The outermost edge B5 of said ledge B4 may be given an oblique or diverging direction with respect to the complementary inner edge that abuts the flange B3 as shown in plan by Fig. 8 or if preferred, the respective complementary ledge edges may be kept substantially parallel as shown in plan by Fig. 13.

Confining the further detailed description for the present to the style of frame that is shown by Figs. 6 to 12 inclusive, it will be observed that said diverging ledge edge B5 is sharply upturned into the longitudinal side sash flange B6 and this in turn is again drawn down at right angles to constitute a horizontal top sash flange B7. The last named flange may be cut away at B7' while the fin-like or outstanding side flange B6 is preferably carried around said pane corner to form the depending portion B6', and all of which elements are embodied in a one piece stamped frame structure.

Said top sash flange may be provided with a plurality of spaced holes B9 adapted to receive screw fastenings for frame supporting purposes. It will be further observed that the shortened rear portion of the flange B7 together with its adjoining side sash flange B6, is set back as at B8' with respect to the outermost overhung end of the pane B2 and thus constitutes a recessed ledge portion B8 as defined in dotted and dashed outline in Fig. 7. The flange length L is designed to fit between the spacing afforded by the narrowest upright sash posts to which my ventilator is to be applied. In order to adapt my frame for a greater spacing of such posts and at the same time provide for a weatherproof closure on part of the longer sash flange required, I resort to an extensible or telescopic cover plate B10 having a slot B10′ adapted to register with one of the flange screw holes B9. The cross-sectional shape given to such sheet metal follow-up plate as used in Fig. 8, is offset in profile to make it snugly conform to the lapped frame parts.

Referring now to my novel method of mounting and securing the cant pane B2 into said ventilator frame B1, the lowermost free end of the narrow depending flange B3 is preferably inturned to form a groove lip or closure B3′ adapted to support the forward bottom edge of the pane B2. In addition, I provide for a separately inserted elbow-like trough B11 preferably made of sheet metal and serving to hold the pane corner B2′ outwardly against the contiguous portion of the pane flange B3. One side face of said curved trough is intended to lie adjacent to the ledge corner portions B4 and B4′ and may be secured thereto in any suitable manner; the other trough side face may be indented to form a plurality of resilient prongs such as B11′, which are spaced from but aligned with the inturned pane flange B3. The intended purpose of said prongs will be apparent from the disposition disclosed in Fig. 8, where the forward marginal edge of the pane is yieldingly grasped between said prongs and the overlapping flange B3 in a rattle-proof manner and at the same time adapted to compensate for any differences in pane thickness. It is however preferred to rely primarily upon the pane securing means that is placed in the clamping strip B12. This strip may be given a cross-sectionally angle shape of which one leg is disposed opposite the horizontal portion of the pane flange B3 so as to grip the inner upper edge of the pane B2 therebetween. The other leg B12′ of said strip abuts the ledge B4 and may be provided with a series of spaced slots such as B13 (see Fig. 8) that run lengthwise of the pane.

Cooperating with said slots is shown a corresponding number of indented locking edges such as B14 which are disposed in a beveled relation with respect to said slot alignment and constitute wedge means adapted to tightly thrust the strip B12 toward its parallelly mounted pane clamping flange B3. Cooperating with each of said beveled edges B14 is a clamp lug B15 that is preferably struck down in depending fashion as shown in Fig. 11 without however cutting through the supporting ledge wall B4. After the upper pane edge has been tightly clamped in place by forcing the strip B12 lengthwise against said lugs, this strip may be secured in adjusted position by means of one or more locking screws and nuts such as B16; one end of the respective screw shanks is preferably riveted and beaded over into the ledge B4 as indicated in Fig. 11 which allows of neatly trimming the frame work. The described simple retaining method securely holds the pane B2 in place and has been found to be most effective for the purpose intended, all without need for resorting to a rubber sheath surrounding the clamped pane edge as in customary practice.

In view of the explicit description given to the structural details of my frame, it is thought the assembly of its various parts will be readily understood. It now remains to elaborate upon the intended mode of installation of my ventilator as applied to a closed car such as is disclosed in Figs. 1 to 5 inclusive.

As a first step it is expedient to loosen the panel stop bead A11 and the channel groove lining A12 from the top rail A6. Thereupon the sash flange B7 is mounted against the bottom face of said rail preferably under said felt lining, and this flange may be secured in place by means of one or more screws such as A14 (see Fig. 4) or the like fastenings entered through the flange holes B9 to give support to the overhanging ledge and the adjoined portions of my canopy like ventilator frame assembly. The forward fin-like or depending side flange portion B6′ is intended to be inserted against the inner face of the rabbet A10 of the upright sash post A5 while the rearward portion of the clamped pane strip B2 extends over the opposite upright sash post A5′. As will be apparent, the follow-up cover plate B10 is intended to be longitudinally extended until it abuts the adjoining rear post A5′ and is made to fill up the ledge recess B8.

The described ventilator mounting is such that the panel A4 may without interference be opened or closed with respect to the top rail A6 and when partially opened as indicated in Fig. 4, there will be formed a horizontal or bottom gap A15 between the lower edge of the dropped panel A4 that is adapted to suck air out of the car body. As shown in Fig. 5, such canopy opening may be supplemented by a complementary vertical ventilator gap A16 formed between the outermost rear end of the diverging or canting pane B2. The resulting ultimate ventilation which my device delivers is therefore measured by the combined suction effect produced through both the gaps A15 and A16, and this in turn augments its capacity as compared with present conventional types of canopy window ventilators where only one, that is to say the lower pane edge is so utilized.

In addition, the novel overlapping rear edge feature of my ventilator pane allows a single pane length to be properly and neatly installed on cars having different door or window sash widths, all of which materially simplifies the stocking problem on part of ventilator dealers. As was pointed out, my extensible cover plate further permits of readily following up any reasonable differences in spacing between sash posts and thus provides for making a closed weather proof joint with respect to the vehicle window to which my canopy-like ventilator may be applied.

Finally, touching upon the modified style of ventilator frame disclosed in Figs. 13 and 14, there is here shown a cant pane B2 whose lower edge is tilted outwardly with respect to body side and mounted parallel therewith rather than in the diverging relation represented in Fig. 5. The stepped cross-sectional profile of such modified frame is substantially similar in underlying structure to that previously described. In the present instance, the side faces of the pane locking strip B12 are spread somewhat to make them snugly fit the upper face margin of the changed angular slope given to the cant pane B2 and its overlapping pane flange B3. The same style of locking strip and cooperating clamp lug devices are likewise resorted to for thrusting the pane against said pane flange. It will also be evident that in Figs. 13 and 14, the two pane gaps A15 and A16 are still present and that the rear pane end overhangs the rear sash post in the fashion embodied in the alternative disclosure first described.

Either style of canopy ventilator can easily be secured to the top rail of a closed car window without marring the sash in any way. When installed, my ventilator is entirely free from rattles or squeaks and it does not interfere with the complete raising of the window panel. Owing to the indirect method of ventilation, a supply of fresh air is constantly being supplied and circulated while the car is in motion without however setting up disagreeable drafts or cross-currents within the passenger compartment; this in turn serves to clear the body of any foul air, also the accumulation of fumes or deadly carbon monoxide gas that might be escaping into such closed compartment. Smoke or dust from without does not enter through my ventilator gap openings when having to travel through a cloud of dust or similarly contaminated atmosphere. Finally, the pleasing design of my device lends the desired touch of distinction to the car appearance and thus enhances the body ensemble; it furthermore accomplishes the cited advantages without sacrifice of ventilation even under inclement weather conditions, shutting out light from the car interior, or obstructing clear side visibility through the window panel to which my ventilator may be applied.

Although certain specific embodiments and shapes of ventilator frames have been herein set forth, I do not wish to be limited to my particular arrangement and form of parts, since various changes may be resorted to, all without departing from the spirit and scope of my invention, heretofore described and more particularly pointed out in the appended claims.

Claims:

1. In a ventilator comprising a sheet metal frame adapted to supportably mount a pane having a substantially straight edge, said frame being provided with a ledge portion and an angularly disposed stop flange therefor adapted to overlap a marginal pane face adjacent to said edge, clamping strip means including wedge adjusting means therefor, said strip being angle-shape in profile with one of its legs disposed to align with a ledge portion while its other leg is disposed to substantially align with said stop flange and grip the opposite complementary pane face portion, and clamp lug means carried by said ledge and cooperating with said wedge to thrust said strip toward said flange for pane clamping purposes.

2. In a ventilator comprising a unitary frame member adapted to supportably mount a strip-like pane and which frame is provided with a primary ledge portion adapted to align with a longitudinal pane edge and also with a supplementary depending ledge portion adapted to align with one transverse edge of said pane, each of such angularly disposed ledge portions having a stop flange respectively adapted to overlap a marginal portion of their contiguous pane faces, clamping strip means carried by said primary ledge and adapted to adjustably thrust the aforesaid longitudinal pane margin against said longitudinally disposed stop flange, and a separate clamping member serving to thrust said transverse pane margin against said transversely disposed stop flange.

3. The combination with a window provided with a pair of channeled side-posts together with a cross rail therebetween, a regulative panel adapted to be initially opened away from said rail, a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with a ledge portion having a recess and which ledge carries a supporting flange adapted to be secured to the rail and extend therealong for the major portion of the rail length, and an extensible member telescopically mounted upon said frame to partially cover said recess.

4. The combination with a window provided with a pair of channeled side posts together with a cross rail therebetween, a regulative panel adapted to be initially opened away from said rail, and a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with a rail securing means extending along a major portion of the rail length and equipt with extensible cover means adapted to follow up the first named means and complete a weather proof joint along the entire rail length.

5. The combination with a window provided with a pair of channeled side posts together with a grooved cross rail therebetween, a regulative panel adapted to be initially opened away from said rail, and a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with a longitudinal sash side flange adjoined to a depending side flange projecting beyond one end of said pane for insertion into one of the post channels and which longitudinal flange carries a top sash flange adapted to be supported by and extend along the major portion of the rail groove with the opposite free pane end disposed in overlapping relation to the other of said posts.

6. The combination with a window provided with a pair of channeled side posts together with a cross rail therebetween, a regulative panel adapted to be initially opened away from said rail, and a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with supporting means and with gripping means associated with a longitudinal pane margin adapted to hold one of the pane ends adjacent to one post while the other pane end is disposed in overlapping spaced relation to the other post.

7. The combination with a window provided with a pair of channeled side posts together with a cross rail therebetween, a regulative panel adapted to be initially opened away from said rail, and a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with pane gripping means making a weather proof joint with the marginal face portions of but two of the pane edges and allowing one of the free pane edges to overlap a sash post.

8. The combination with a window provided with a pair of channeled side posts together with a cross rail therebetween, a panel adapted to be initially opened away from said rail, a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with rattle proof gripping means associated with the marginal face portions of but two of the pane edges and providing for gaps with respect to the remaining pane edges that allow of ventilation through said window opening, and window regulator means for said panel serving when closed to simultaneously shut off ventilation through said gaps.

9. The combination with a window provided with a pair of channeled side posts together with a channeled cross rail therebetween, a regulative panel adapted to be initially opened away from said rail, a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being designed for attachment between posts having a predetermined minimum spacing and provided with pane gripping means adapted to make a weather proof seal along certain of the pane edges and allowing another pane edge to overlap one of said posts, and extensible closing means for said frame adapted to compensate for spacing between said sash posts that exceeds the aforesaid minimum spacing.

10. The combination with a window provided with a pair of channeled side posts together with a grooved cross rail therebetween, a regulative panel adapted to be initially opened away from said rail, a canopy-like ventilator overhangingly disposed from the window sash portions to partially cover initial panel opening and which ventilator comprises a unitary frame member serving to mount a comparatively narrow transparent pane that is longer than said rail and is set in tilted cooperative relation to said panel, said frame being provided with a supporting sash flange adapted to enter said rail groove and with gripping means adapted to make a rattle proof joint along certain of the pane edges and allowing another pane edge to overlap one of said posts, and a lining for the rail groove, said frame flange being secured to said rail underneath said lining.

In testimony whereof, I have herewith set my hand this 29th day of September, 1927.

DANIEL M. WINANS.